United States Patent

[11] 3,615,806

| [72] | Inventors | Andrew Torock<br>Morris Plains;<br>Thomas F. Walsh, Parsippany, both of N.J. |
|------|-----------|---|
| [21] | Appl. No. | 782,722 |
| [22] | Filed | Dec. 10, 1968 |
| [45] | Patented | Oct. 26, 1971 |
| [73] | Assignee | Georgia Kaolin Company |

[54] KAOLIN PIGMENTS AND METHODS OF PRODUCING THE SAME
3 Claims, No Drawings

[52] U.S. Cl. .................................................... 106/288 B,
106/72, 23/110 P
[51] Int. Cl. ........................................................ C08h 17/06,
C09c 1/28
[50] Field of Search .......................................... 106/72, 288
I; 23/110.2

[56] References Cited
UNITED STATES PATENTS

| 3,171,718 | 3/1965 | Gunn et al. | 106/72 |
| 3,343,973 | 9/1967 | Billue | 106/288 I |

*Primary Examiner*—James E. Poer
*Attorney*—Buell, Blenko & Ziesenheim

ABSTRACT: A new kaolin pigment and method of producing the same are provided in which the pigment is made up of thin, platelike particles having an equivalent spherical diameter by Stokesian methods greater than 2 microns, an average aspect ratio of thickness to diameter of about 1:20, and being substantially free of stacks and produced by delaminating a slurry having particles not less than 5 microns e.s.d. until substantially free of stacks, removing the particles of less than 2 microns e.s.d. and recovering the remainder as the product.

KAOLIN PIGMENTS AND METHODS OF PRODUCING THE SAME

This invention relates to kaolin pigments and methods of producing the same and particularly to a delaminated kaolin pigment in the form of very thin, broad platelets, substantially free of fine particles and having an average aspect ratio of thickness to diameter of approximately 1:20.

It is well known that naturally occuring kaolin consists of fine particles of widely distributed particle size. Two forms of particles occur in natural kaolin. These two forms are, one, a thin hexagonal-shaped platelet with equivalent spherical diameter of 2 microns or less by Stokesian methods; the other form consists of platelets stacked, face to face, forming a massive particle with equivalent spherical diameter greater than 2 microns, occasionally exceeding 100 microns in equivalent spherical diameter.

The fact that naturally occurring kaolin stacks can be delaminated by the application of shearing force, thereby reducing the kaolin stacks to thin platelets, is also well known. This is the basis for methods of increasing the recovery of fine particle pigments for paper coating and the like from coarse natural clays. Kaolin stacks may be sheared apart to produce platelets by subjecting a slurry of kaolin stacks to shear action produced by ball or pebble mills, sandgrinders, extruders or rotor-stator colloid mills.

The novel product of this invention is made up of very thin, broad platelets having large ratio of diameter to thickness and substantially completely free of fine particles with small ratio of diameter to thickness. The product has an unusually slippery feel unlike that of natural kaolin which has a sticky or draggy feel when rubbed between the fingers. Besides being very slippery, the product has a tendency to cling to a surface producing excellent hiding properties. When this product is formulated into an exterior paint using no other extender pigment, it results in a paint possessing exceptionally good weathering properties and durability. This is unlike natural kaolin, which produces poor durability in exterior coatings.

The novel product of this invention is produced by subjecting naturally occuring kaolin stacks to intense shearing, more than required for normal delamination, and then selectively fractionating the thin platelets into a narrow distribution range required to produce the novel properties desired.

In preparing the product of this invention, kaolin stacks of 5 microns equivalent spherical diameter or more and preferably principally in the range 10 to 30 microns equivalent spherical diameter are dispersed in water to form a slurry. The slurry is subjected to intensive delamination by means of a suitable apparatus to produce a product which is substantially free of stacks. The product is then subject to a selective fractionation whereby the platelets having an equivalent spherical diameter less than 2 microns are removed. The remaining thin, large diameter platelets are recovered dried and pulverized to produce the desired product of this invention. The resulting product has a particle distribution between 2 to 10 microns by Stokesian methods; however, direct measurement of the platelets by optical microscope methods indicates a range of 5 to 40 microns in actual diameter. The extreme thinness and unusual area of the platelets apparently causes the platelets to settle as though they were smaller particles, thus the equivalent spherical diameter measurements by Stokesian methods indicate smaller values of particle size than are indicated by optical measurements.

The delamination to produce the product of this invention may be carried out in one or two steps. Preferably the delamination is accomplished by subjecting a slurry having kaolin stacks of at least 5 microns e.s.d. and preferably in the range 10 to 30 microns e.s.d. to delamination in a sandgrinder or super extruder. Removing the particles less than 2 microns e.s.d. and again subjecting the particles greater than 2 microns e.s.d. to a second delamination of greater intensity and duration, followed by removal of the particles of less than 2 microns e.s.d. The remaining thin, large diameter platelets are filtered, dried and pulverized to produce the product of this invention. Alternatively the product can be produced by a single intense delamination by subjecting a slurry of particles having kaolin stacks at least 5 microns e.s.d. in size and preferably in the range 10 to 30 microns to delamination in a sandgrinder or the like, removing the particles less than 2 microns e.s.d., recovering the larger particles, drying and pulverizing to produce the product of this invention.

The invention can perhaps be best understood by referring to the following examples illustrating the practice of the invention and the novel product produced thereby.

EXAMPLE I

Kaolin stacks, whose equivalent spherical diameter range was 5 microns to 40 microns, with 50 percent of the stacks being in the range of 15 to 30 microns equivalent spherical diameter, were slurried with water and 0.5 percent Calgon, based on the dry weight of kaolin, to form a 35 percent solids slurry.

The kaolin stack slurry (1,000 ml.) was charged into a batch sandgrinder containing 2,000 ml. of 6 to 8 mesh special glass grinding beads.

Step 1

The initial delamination step was carried out by subjecting the above charge to a grind at 300 r.p.m. for a period of 5 minutes.

Following the initial delamination step, platelets less than 2 microns equivalent spherical diameter were substantially removed from the slurry by means of centrifugal fractionation. The remaining slurry, containing platelets greater than 2 microns, was recharged into the sandgrinder unit.

Step 2

The second delamination step was carried out by subjecting the slurry containing the greater than 2 microns fraction of step 1 to a grind at 900 r.p.m. for a period of 20 minutes.

Following the grinding, the slurry was again subjected to centrifugal fractionation whereby essentially all particles less than 2 microns equivalent spherical diameter were removed. The product remaining in the slurry was dewatered by filtration, dried and pulverized.

Some important physical properties of the product are listed in table I.

TABLE I

| | |
|---|---|
| G. E. Brightness | 88.0 |
| B. E. T. Surface Area | 5.6 M²/g. |
| Cation Exchange Capacity | 5.0 meg./100 g. |
| Apparent Bulk Density | 9.5 lbs./cu.ft. |
| Oil Absorption—Gardener-Coleman | 60% |
| Particle Size Distribution, e.s.d. | 90% > 2μ |
| | 20% > 5μ |
| | 10% > 10μ |
| Particle Size Range, Optical | 5 to 40 microns |

EXAMPLE II

Kaolin stacks whose equivalent spherical diameter range was 5 microns to 40 microns, with over 50 percent of the stacks being in the range of 15 to 30 microns equivalent spherical diameter, were slurried with water and 0.5 percent Calgon, based upon the dry weight of kaolin, to form a 35 percent solids slurry.

The kaolin slurry (1,000 ml.) was charged into a batch sandgrinder containing 2,000 ml. of 50 to 60 mesh special glass grinding beads.

Step 1

The delamination was carried out by subjecting the above charge to a grind at 900 r.p.m. for a period of 30 minutes.

Following the delamination period, the slurry was subjected to centrifugal particle fractionation whereby essentially all platelets less than 2 microns equivalent spherical diameter were removed. The product remaining in the slurry, which consisted of platelets ranging from 2 to 10 microns equivalent spherical diameter, was filtered to remove water and dried.

The physical properties of the product were identical to those listed in table I.

Although the novel product of this invention may be produced by a single delamination procedure, as outlined in example II, we prefer the two-step procedure since it is much more efficient.

As we have earlier pointed out, the novel product of this invention possesses some very unique and useful properties. The particles of this product are very thin, broad platelets with an average aspect ratio of thickness to diameter of approximately 1:20. Also, because it is substantially completely free of fine particles with smaller aspect ratios, the powdered product produces an unusually slippery feel when rubbed between one's fingers. This is unlike natural kaolin, which has a draggy feel when rubbed between one's fingers. The powdered product, besides possessing smooth slip when applied to skin, also clings to the skin surface, producing excellent hide. This property, as well as maintaining the usual properties associated with kaolin, makes it very desirable for cosmetic powder applications.

Another unexpected property of the novel product of this invention is the ability to disperse easily in nonaqueous systems. This is unlike other kaolin products which disperse well in aqueous systems, but not in nonaqueous systems.

Kaolins may be surface treated to render them hydrophobic and dispersible in organic systems. However, this treatment prevents their dispersion in aqueous systems. The novel product of this invention possesses both hydrophobic and hydrophilic nature. It will disperse with equal ease in both aqueous and nonaqueous systems without any special chemical surface treatment.

The following comparative test data illustrates the superior dispersibility of the novel product of this invention when it is dispersed in a polyester resin.

Test Method 80 grams kaolin
    120 grams MR-28 V Polyester Resin
    Blend with high shear mixer for 5 minutes.
    De-air, cool to 250° C. and measure viscosity
    of system with Brookfield Viscometer at 10 r.p.m.
    Report viscosity in centipoise units.

Results

TABLE II

| Kaolin | Brookfield Viscosity at 25°C. 10 r.p.m. |
| --- | --- |
| Product of Invention | 1,440 c.p.s. |
| Natural Kaolin, 2 microns | 88,000 c.p.s. |
| Delaminated Kaolin, 2 microns | 60,000 c.p.s. |
| Surface Modified Kaolin (hydrophobic) | 6,800 c.p.s. |

The results shown in table II illustrate the excellent dispersion characteristics of the novel product of this invention by the unusually low viscosity produced when incorporated into a polyester resin. It also illustrates its usefulness as a polyester resin filler. The low viscosity characteristic and ease of dispersion allows a compounder to incorporate a high percentage of filler, thereby reducing the cost of product, as well as improving surface properties of the finished plastic.

When the novel product of this invention is used as an extender pigment in paint, it imparts superior properties. More specifically, it imparts superior enamel holdout and hiding to the applied paint film. Also, the resulting paint film possesses a very uniform low sheen.

The following comparative test results illustrative the advantages produced by our product when used in a typical paint formula.

Test Paint Formulation

| Ingredients | Pounds | | 1# $TiO_2$ per gal. | 2# $TiO_2$ per gal. |
| --- | --- | --- | --- | --- |
| Rutile $TiO_2$ | 100 | 200 | 3.01 | 6.02 |
| Extender Kaolin | 197 | 167 | 9.06 | 7.56 |
| Atomite | 203 | 171 | 9.06 | 7.56 |
| KTPP | 1 | 1 | | |
| Tamol 731 | 8 | 8 | 0.94 | 0.94 |
| Igepal 610 | 4 | 4 | 0.46 | 0.46 |
| Colloid 581-B | 3 | 3 | 0.32 | 0.32 |
| Nildew AC-30 | 1 | 1 | 0.90 | 0.90 |
| Carbitol Acetate | 10 | 10 | 1.92 | 1.92 |
| Ethylene Glycol | 25 | 25 | 2.69 | 2.69 |
| Natrosol 250 HR, 2% solution | 150 | 150 | 18.00 | 18.00 |
| Water | 250 | 250 | | |
| Flexbond 315 | 273 | 273 | 30.00 | 30.00 |
| $NH_4OH$, 28% | 3 | 3 | 30.00 | 30.00 |
| | 1,228 | 1,266 | 106.36 | 106.37 |

Properties of Paint Film

| | 1# $TiO_2$ per gal. | 2# $TiO_2$ per gal. |
| --- | --- | --- |
| Pigment, % | 41 | 43 |
| Solids, % | 43 | 45 |
| Pounds per Gallon | 11.6 | 12.0 |
| PVC, % | 56 | 56 |
| Viscosity Range, KU | 80–90 | |

TABLE III

Properties of Paint Film

| Extenders | Viscosity | Film thickness | Reflectance | Contrast ratio | 60° gloss | 75° sheen | Percent enamel holdout |
| --- | --- | --- | --- | --- | --- | --- | --- |
| Product of Invention 1# $TiO_2$/gal. | 87 KU | .003 .0015 | 88.4 87.0 | .9661 .8644 | 2 2 | 2 2 | 93.75 |
| Product of Invention 2# $TiO_2$/gal. | 86 KU | .003 .0015 | 90.5 88.7 | .9834 .9200 | 2 2 | 3 3 | 98.75 |
| Extender No. 1 1# $TiO_2$/gal. | 83 KU | .003 .0015 | 88.2 87.0 | .9558 .8391 | 2 2 | 4 4 | 91.25 |
| Extender No. 1 2# $TiO_2$/gal. | 84 KU | .003 .0015 | 90.5 88.6 | .9834 .9199 | 2 2 | 7 6 | 88.75 |
| Extender No. 2 1# $TiO_2$/gal. | 84 KU | .003 .0015 | 88.0 86.5 | .9477 .8497 | 2 2 | 7 6 | 90.00 |
| Extender No. 2 2# $TiO_2$/gal. | 85 KU | .003 .0015 | 90.8 88.7 | .9769 .9109 | 2 2 | 14 13 | 81.30 |
| Extender No. 3 1# $TiO_2$/gal. | 83 KU | .003 .0015 | 90.6 88.3 | .9636 .8573 | 2 2 | 4 3 | 83.80 |
| Extender No. 3 2# $TiO_2$/gal. | 88 KU | .003 .0015 | 92.6 90.0 | .9827 .9256 | 2 2 | 6 5 | 77.50 |

Extender No. 1 Delaminated Kaolin, 2 microns
Extender No. 2 Natural Kaolin, 2 microns
Extender No. 3 Calcined Kaolin The results tabulated in table III shown the exceptionally low uniform sheen imparted by our product even when compared to calcined kaolins. The superior enamel holdout properties imparted by the novel product of this invention indicates excellent film integrity and low porosity.

When the novel product of this invention is formulated into an exterior paint, using no other extender pigment, it results in a paint possessing exceptionally good weathering properties and durability. This is unlike natural kaolin, which produces poor durability in exterior coatings.

We believe the excellent functionality of the product in exterior paints is due again to its unique thin, broad platelets which are substantially completely free of fine particles. When a paint containing our product is applied to a surface, the thin, broad platelets lie flat and orient in the same direction, thus producing an overlapping shingle effect. This overlapping effect tends to produce a smooth, resistant film, yet it allows vapors to pass, thereby preventing moisture vapor damage.

Other applications which could take advantage of the unique properties of the novel product of this invention are as dry lubricants, fireproof paints, dry mold release and lubricant, thermoplastic reinforcement and the like.

While we have illustrated and described certain preferred embodiments and practices of our invention, it will be understood that the invention may otherwise be embodied within the scope of the following claims.

We claim:

1. A new delaminated kaolin pigment in the form of thin platelike particles derived from kaolin stacks consisting essentially of thin, platelike particles having an equivalent spherical diameter by stokesian methods greater than 2 microns, an average aspect ratio of thickness to diameter of about 1:20 and being substantially free of stacks and substantially free of particles below 2 microns in equivalent spherical diameter.

2. A kaolin pigment as claimed in claim 1, wherein the average particle diameter by optical measurements is in the range 5 microns to 40 microns.

3. A kaolin pigment as claimed in claim 1 derived from kaolin stacks whose minimum particle size is at least 5 microns e.s.d.

* * * * *

UNITED STATES PATENT OFFICE
CERTIFICATE OF CORRECTION

Patent No. 3,615,806          Dated  October 26, 1971

Inventor(s)  Andrew Torok, et al

It is certified that error appears in the above-identified patent and that said Letters Patent are hereby corrected as shown below:

On the cover sheet, the ventor's name "Torock" should read -- Torok --.

Signed and sealed this 24th day of October 1972.

(SEAL)
Attest:

EDWARD M.FLETCHER,JR.          ROBERT GOTTSCHALK
Attesting Officer              Commissioner of Patents